United States Patent Office 3,698,925
Patented Oct. 17, 1972

3,698,925
APPLICATION OF COPOLYMERS OF POLYVINYL ACETALS AS A MEANS FOR PROTECTION, PRESERVATION, RESTORATION, STABILIZATION, HYDROPHOBIZATION OF PAPYRUS, PAPERS, BOOKS AND/OR MANUSCRIPTS
Karl Salz and Ladislav Skrivanek, Prague, Czechoslovakia, assignors to World Patent Development Corp.
No Drawing. Filed July 8, 1969, Ser. No. 840,048
Claims priority, application Czechoslovakia, July 12, 1968, 5,131/68
Int. Cl. B23p 7/00; B32b 35/00
U.S. Cl. 117—2 R          18 Claims

ABSTRACT OF THE DISCLOSURE

This invention is directed to restoration and preservation of cultural items on papyrus and/or paper (whether new or old) by impregnating same with a solvent solution of copolymers of polyvinyl acetals; or by laminating a free film of such copolymers to either or both faces of the document to be treated, with or without an interposed sheet of fine inert textile as a reinforcement; or by impregnating such document with the copolymers, then splitting the document down its median plane and then inserting a copolymer impregnated textile sheet between the split halves and reuniting the split halves. Once treated, such cultural items retain their papyrus-like and/or paper-like qualities; yet, these cultural items have enhanced strength and color stability, are impervious to soiling, are resistant to aging, wear and mould formation and are waterproof.

THE INVENTION

This invention relates generally to new and useful improvements in prolonged preservation of degradable sheet materials and particularly seeks to provide novel means and methods for prolonging life of original paper documents and the like and for restoring and preserving such materials after damage or degradation has occurred.

It is well known that papyrus and papers, particularly those made from vegetable or wood cellulose fibers, are subject to degradation with age and frequently become stained and brittle. Accordingly, any cultural items such as manuscripts, books, prints, drawings, paintings, maps, photographs, photoreproductions and the like when applied to such papyrus or papers will suffer comparable damage.

The volume of old and damaged cultural items of the type here contemplated is massive and there is a great need for an effective and safe way for restoring their strength, soundness and clarity and for preserving their lives against further aging. Further, there is a need for a simple process which can be applied to new and valuable cultural items which can be applied during manufacture of these items to increase their longevity.

Heretofore efforts to solve this problem have consisted of adhesively securing tissue paper or fabrics to damaged areas of such cultural items with animal or vegetable adhesives. This procedure is unsatisfactory because its curative effect is of short duration.

More recently, transparent or translucent films, such as plasticized cellulose acetate or polyvinyl chloride, have been laminated under heat and pressure to the faces of a document, with a light weight fine mesh fabric interposed between the film and the document. Variations of this laminating technique also have been developed. However, these techniques presuppose that the documents being treated retain sufficient strength to withstand manual handling, otherwise laminating cannot be used. Furthermore, such techniques do not restore the appearance of the documents and cannot be used on books because of the cumulative thickness build up and because of technical problems relating to bindings.

However, the methods and materials of this invention enable safe and permanent restoration and preservation of all such cultural items, including bound books, whether such cultural items are old or new.

Therefore, an object of this invention is to provide a novel method of restoring and preserving such cultural items that includes use of a solvent solution of copolymers of polyvinyl acetals.

Another object of this invention is to provide a method of the character stated which results in the treated item being stronger, waterproof, color fast, fadeproof, dimensionally stable, stainproof, and acid and alkali resistant, while the material used to achieve these results remains substantially transparent.

Another object of this invention is to provide a method of the character stated in which a cultural item to be preserved is impregnated with the copolymer solution, dried and further treated as by bleaching and/or neutralizing to enhance readability, and if necessary preserved after bleaching and/or neutralizing for further treatment.

Another object of this invention is to provide a method of the character stated in which the copolymer solution is cast or otherwise formed into a film which is then laminated to one or both faces of the document to be preserved, with or without a sheen of light-weight fine-mesh fabric (either natural or synthetic) interposed therebetween. A typical fabric used for this purpose is a fine-mesh polyamide silk.

Another object of this invention is to provide a method of the character stated in which a badly damaged document is first impregnated with the copolymer solution, is mounted on a fine-mesh polyamide silk, is then bleached and/or neutralized and is further treated with the copolymer solution.

Another object of this invention is to provide a method of the character stated in which a badly damaged document is first impregnated with the copolymer solution, dried, split in half along its median plane and then rejoined through the medium of a fabric sheet impregnated with said copolymer solution and inserted between the split halves of said document.

A further object of this invention is to provide a method of the character stated in which a bound book may be preserved simply by immersing same in the copolymer solution, draining the excess solution, and permitting the retained solution to dry while separating the pages and covers of the book.

A further object of this invention is to provide a novel composition of copolymers of polyvinyl acetals for preservation treatment of such cultural items.

With these and other objects, the nature of which will be apparent, the invention will be understood more fully by reference to the accompanying detailed description and the appended claims.

In accordance with this invention a restorative and preservative for such cultural items comprises a copolymer consisting of from 15–25% polyvinyl alcohol, 1–3% polyvinyl acetate and from 70–82% of copolymers of polyvinyl alcohol and formaldehyde, acetaldehyde and/or butyraldehyde in which the ratio of butyraldehyde to formaldehyde and/or acetaldehyde is from about 5:1 to 20:1. These form a substantially dry powder of about 98% by weight of solids and about 2% moisture.

The copolymer powder is dissolved in an organic solvent, such as ethanol, under reflux, to produce a solution of the desired concentration which may be from about 2% to 15% or more, based on the weight of the solids. Preferably a 15% solution is prepared which may be further diluted with ethanol to achieve any desired lower concentration.

A small amount of an antiseptic, such as a 0.5 to 2.0% solution of p-chlor-m-cresol in ethanol or some other antiseptic which is soluble in ethanol, may be added as an inhibiting agent against bacteria and moulds. Similarly, a small amount of a neutralizing and stabilizing agent such as 4.0 to 6.0% solution of magnesium acetate in ethanol or some other neutralizing and stabilizing agent which is soluble in ethanol, may be added as a neutralizing and stabilizing agent.

Thus, a single copolymer solution is created that not only is capable of restoring and preserving such damaged cultural items, but also provides protection against acidity, bacteria and moulds.

The copolymer powder is also soluble or partially soluble in solvents such as acetone, ether, trichloroethylene, xylene, toluene and amylacetate, although the toxicity and/or explosiveness of several of these renders their use undesirable in document restoration laboratories, even though technically feasible. Amylacetate should be used in place of ethanol in those instances where the item undergoing restoration has alcohol soluble inks, dyes, pigments or other alcohol soluble materials on its surface.

The following examples are illustrative of the method of this invention:

EXAMPLE 1

A badly damaged, brittle and stained printed sheet of paper was impregnated with an ethanol solution containing about 7.5% by weight of a copolymer of polyvinyl acetal having 72.5% of butyral groups, 17.5% of hydroxylated groups, 8% of formal groups and 2% of acetal groups, and dried. The treated paper was restored in strength, was dimensionally stable, and could readily be handled for further restoration.

EXAMPLE 2

The treated paper from Example 1 was then bleached with an aqueous chlorine bleach through the applied copolymer to increase the brightness to a substantial degree without harm to the printing.

EXAMPLE 3

A cast film sheet was prepared from the copolymer solution from a 10% by weight solution of a copolymer, was laminated under heat and pressure in a platen press to each face of the bleached paper of Example 2 to further reinforce same. As a modification a sheet of light weight fine mesh inert fabric was interposed between each film sheet and the associated face of the paper.

EXAMPLE 4

A covered book of old prints was immersed into a solution of about 5% of the copolymer, lifted out and drained to remove the excess solution while separating the print pages and covers to enhance drying. Perfect preservation and waterproofness was achieved.

Typical test results of papers treated in accordance with this invention are listed below:

WATER ABSORPTION (5% BY WEIGHT COPOLYMER SOLUTION)

| Paper | Basis weight (grams per square meter) | Increase in weight (percent) |
|---|---|---|
| Rag | 70 | 7.3 |
| Filter | 110 | 6.7 |
| Groundwood gravure | 60 | 8.8 |
| Groundwood free offset printing | 90 | 6.6 |

Dimensional stability (7.5% by weight copolymer solution)

Rag and groundwood free offset printing papers were dimensionally stable when subjected to reversible cycles of changes in relative humidity from 25 to 75% at 20° C.

TENSILE STRENGTH (7.5% BY WEIGHT COPOLYMER SOLUTION)

| | Strength (kilograms) of— | | | |
|---|---|---|---|---|
| | Rag paper | | Offset printing paper | |
| | Untreated | Treated | Untreated | Treated |
| Machine | 2.33 | 4.47 | 7.81 | 10.3 |
| Cross machine | 2.08 | 3.40 | 4.43 | 6.1 |
| Mean | 2.21 | 3.93 | 6.11 | 8.2 |

The test samples were the standard 2.5 cm. wide according to Czechoslovakian Standard 50 0340 for both lengthwise and crosswise directions.

Humid cyclic heat (7.5% by weight copolymer solution)

Cyclic heat from 25°–40% Celsius at 96° relative humidity was applied to treated samples for 21 days which corresponds to five years in a tropical climate. All samples remained unchanged.

Fadeometer

Treated test samples were fadeometer tested for 10 days which corresponds to six months exposure to direct sun radiation. All samples remained unchanged.

Mould resistance (copolymer with p-chlor-m-cresol)

Treated samples of filter paper and rag paper were exposed to *Aspergillus niger* and *Penicillium expansum* under optimum conditions for mould growth, namely, 30° C. and 100% humidity. Paper samples preserved with a 5% copolymer solution with 2% p-chlor-m-cresol were resistant to both types of moulds.

It should be noted that 5–7.5% copolymer solutions should be used where bleaching is to be effected and 8–12% solutions where bleaching is not to be effected. The paper strength about doubles with about a 7.5% solution.

When the copolymer films are to be laminated to a document, with or without an interposed textile sheet, a platen press should be employed at a pressure of 16–25 kg. per square cm. at a temperature of around 80–100° C.

We claim:

1. A method for preserving an item selected from a group consisting of papyrus, paper, a book and a manuscript; comprising the steps of:
   impregnating the item with a solvent solution of a copolymer of polyvinyl acetals comprising about 15–25% by weight of polyvinyl alcohol, 1–3% polyvinyl acetate and 70–82% of one or more polyvinyl acetals selected from a group consisting of acetals of formaldehyde, acetaldehyde and butyraldehyde at a 2–15% by weight concentration; then
   drying the item.

2. The method of claim 1 with the polyvinyl acetals of formaldehyde, acetaldehyde and butyraldehyde.

3. The method of claim 1 in which the ratio of the butyraldehyde to the formaldehyde and/or the acetaldehyde is from 5:1 to 20:1.

4. The method of claim 3 with the copolymer dissolved in an organic solvent.

5. The method of claim 4 with the copolymer at a 2–7% by weight concentration.

6. The method of claim 5 with the copolymer at a 7–15% by weight concentration.

7. The method of claim 3 with the solvent selected from a group consisting of ethanol and amylacetate.

8. The method of claim 7 with a neutralizing agent added to the solvent.

9. The method of claim 8 with a mould-inhibiting agent added to the solvent.

10. A method for restoring and preserving an item selected from a group consisting of papyrus, paper, a book and a manuscript; comprising the steps of:
   impregnating the item with a solvent solution of a copolymer of polyvinyl acetals comprising about 15-25% by weight of polyvinyl alcohol, 1-3% polyvinyl acetate and 70-82% of one or more polyvinyl acetals selected from a group consisting of acetals of formaldehyde, acetaldehyde and butyraldehyde at a 2-15% by weight concentration; then
   drying the item.

11. The method of claim 10 with the polyvinyl acetals of formaldehyde, acetaldehyde and butyraldehyde.

12. The method of claim 10 in which the ratio of the butyraldehyde to the formaldehyde and/or the acetaldehyde is from 5:1 to 20:1.

13. The method of claim 12 with the copolymer dissolved in an organic solvent.

14. The method of claim 13 with the copolymer at a 2-7% by weight concentration.

15. The method of claim 14 with the copolymer at a 7-15% by weight concentration.

16. The method of claim 13 with the solvent selected from a group consisting of ethanol and amylacetate.

17. The method of claim 16 with a neutralizing agent added to the solvent.

18. The method of claim 17 with a mould-inhibiting agent added to the solvent.

References Cited

UNITED STATES PATENTS

| | | | |
|---|---|---|---|
| 3,372,048 | 3/1968 | Weissbein | 117—2 |
| 3,165,423 | 1/1965 | Caldwell et al. | 117—138.5 |
| 2,882,181 | 4/1959 | Hoffman | 117—2 |

OTHER REFERENCES

In Encyclopedia of Chemical Technology, ed. by Kirk and Othmer, New York Interscience Encyclopedia, vol. 14, 1955, pp. 708–723.

RALPH S. KENDALL, Primary Examiner

M. F. ESPOSITO, Assistant Examiner

U.S. Cl. X.R.

117—138.5, 155 L